United States Patent [19]

Wilhoit

[11] Patent Number: 5,283,128
[45] Date of Patent: Feb. 1, 1994

[54] BIAXIALLY ORIENTED HEAT SHRINKABLE FILM

[75] Inventor: Darrell L. Wilhoit, Joliet, Ill.

[73] Assignee: Viskase Corporation, Chicago, Ill.

[21] Appl. No.: 855,826

[22] Filed: Mar. 23, 1992

[51] Int. Cl.$^5$ ............................................. B32B 27/00
[52] U.S. Cl. ................................... 428/516; 428/349; 428/508; 428/910; 428/34.9; 525/240
[58] Field of Search ............. 428/349, 516, 910, 34.9; 525/240, 500

[56] References Cited

U.S. PATENT DOCUMENTS

| | | |
|---|---|---|
| 3,456,044 | 7/1969 | Pahlke . |
| 3,741,253 | 6/1973 | Brax et al. . |
| 4,469,753 | 9/1984 | Yoshimura et al. . |
| 4,640,856 | 2/1987 | Ferguson et al. . |
| 4,714,638 | 12/1987 | Lustig et al. . |
| 4,863,769 | 9/1989 | Lustig et al. . |

FOREIGN PATENT DOCUMENTS

| | | |
|---|---|---|
| 982923 | 2/1976 | Canada . |
| 0120503 | 10/1984 | European Pat. Off. . |
| 0410792 | 1/1991 | European Pat. Off. . |
| 2003903-B | 1/1992 | Japan . |

OTHER PUBLICATIONS

Kurtz, S. J., "Plastics and Rubber International", Apr. 1986, vol. II, No. 2, pp. 34-36.

Proceedings of Future-Pak'91, Ninthe International Ryder Conference on Food Packaging Innovations, Oct. 2-4, 1991, "Easy Peelable Lid Material", H. Shigemoto and M. Sugi, pp. 293, 295, 297, 299-316.

"Tafmer", Mitsui Petrochemical Industries, Ltd., 20 pages, undated.

Japanese Patent Application Publication No. 3903/1992 which is Public Disclosure (Kokai) No. 94753/1986 Laid Open to the Public: May 13, 1986 based on Patent Application No. 217565/1984 filed Oct. 16, 1984. Inventors: Nobuy Ishiguro et al., Applicant: Okura Industrial Co., Ltd.

Primary Examiner—Edith Buffalow
Attorney, Agent, or Firm—John C. LeFever

[57] ABSTRACT

A biaxially heat-shrinkable food packaging film comprises a three component blend wherein the major constituents are a polyethylene such as VLDPE or LLDPE or a mixture thereof, EVA and an ethylene alpha-olefin plastomer copolymer of a density below about 0.90 g/cm$^3$.

17 Claims, 2 Drawing Sheets

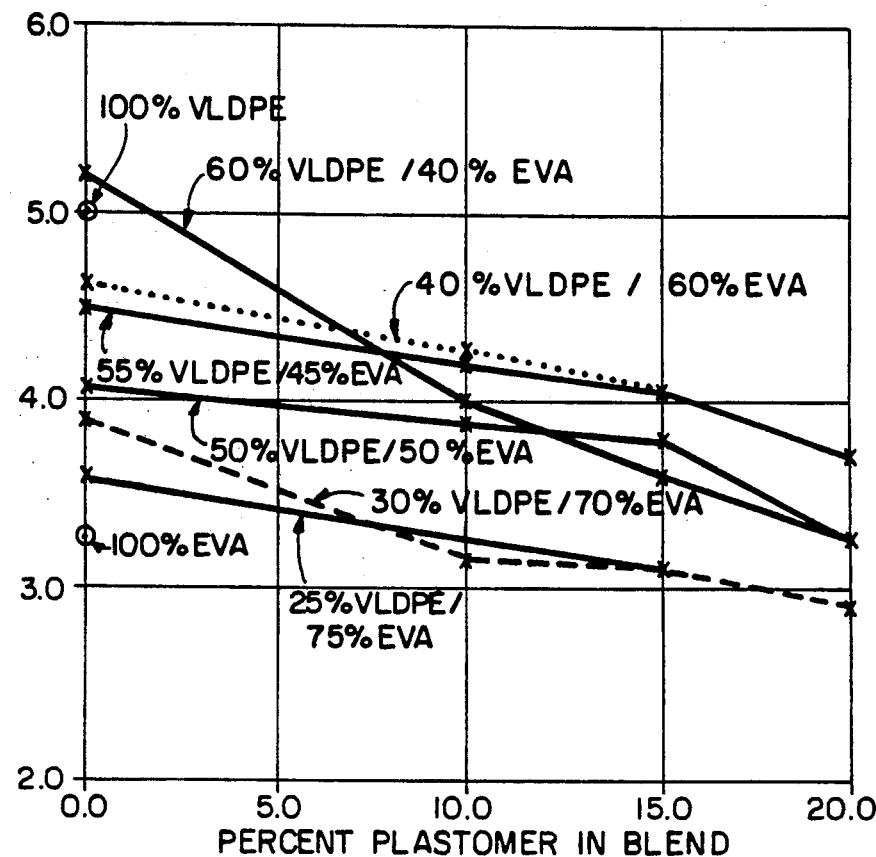
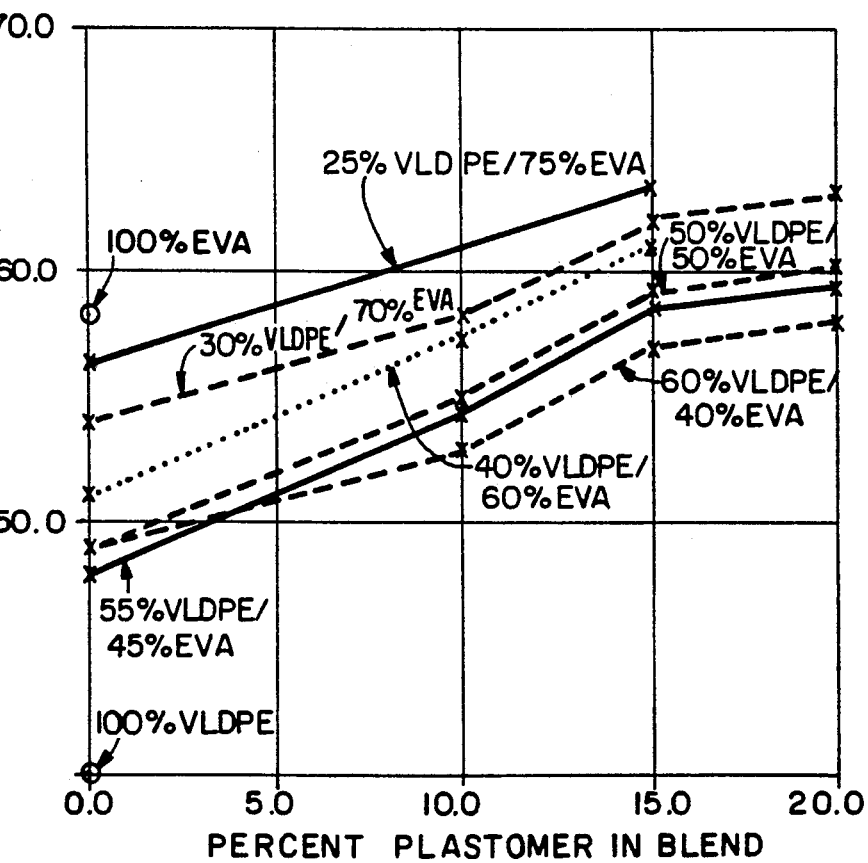

BIAXIALLY ORIENTED HEAT SHRINKABLE FILM

FIELD OF THE INVENTION

This invention relates to an improved biaxially oriented heat-shrinkable film of the type used for packaging food such as poultry, processed meat and fresh red meat.

BACKGROUND OF THE INVENTION

Biaxially oriented heat-shrinkable films of the monolayer type are used in the packaging of poultry. Biaxially oriented heat-shrinkable films of the multilayer type having an oxygen barrier core layer are used in the packaging of processed meat and fresh red meat. As generally understood, a "heat-shrinkable" film tends to return to its original unstretched (unextended) dimension when heated to its softening point. The terms "orientation" or "oriented" are used to describe the manufacture of heat-shrinkable films, wherein resin material is heated above its flow or melting point and extruded through a die into either tubular or sheet form. After cooling, the relatively thick extrudate is reheated to a temperature range suitable to orient or align the crystallites and/or molecules of the material. The orientation temperature range for a given material or materials is understood by those skilled in the art to be in a range which revises the inter-molecular configuration of the material by physical alignment of the crystallites and/or molecules of the material to improve certain mechanical properties of the film such as shrink. When the stretching force is applied in one direction, uniaxial orientation results. When the stretching force is simultaneously applied in two directions, biaxial orientation results.

A commercially used thermoplastic material in the manufacture of biaxially oriented heat-shrinkable films is ethylene vinyl acetate (EVA). This material in the thin film form (e.g. 2.5 mils) is characterized by high shrink properties, for example at least 35% shrink in both the machine (MD) and transverse directions (TD).

Biaxially oriented heat-shrinkable films containing EVA are commonly produced by extruding a primary tube, cooling, and then reheating and expanding the primary tube both longitudinally and transversely by means of different nip roll speeds in the longitudinal direction and air inflation in the transverse direction. One such process is described in the U.S. Pat. No. 3,456,044. This two-step process is often referred to as the double-bubble or the trapped bubble process. When a multilayer film is desired the multiple layers may be coextruded, as for example with an oxygen-barrier core layer and first and second outer layers on each side of the core layer to form the aforementioned primary tube. As for example described in Canadian Patent No. 982,923, these outer layers may comprise EVA and the core layer may comprise a vinylidene chloride copolymer with a comonomer such as vinyl chloride or methyl acrylate. Another commonly used oxygen barrier material is hydrolyzed ethylene vinyl alcohol, i.e. EVOH. Instead of coextrusion the primary tube may be formed by coating lamination, wherein a first outer layer is extruded and thereafter the core and second outer tubular layers are sequentially coated onto the outer surfaces of the first tubular layer and the core layer. As another alternative, the first outer and core outer layers may themselves be coextruded, and the second outer layer thereafter coated onto the outside surface of the core layer. Coating lamination procedures are described in U.S. Pat. No. 3,741,253. As still another alternative, a multiple layer film may be formed as a sheet by the well-known slot casting procedure, and then biaxially oriented into a heat-shrinkable film.

One limitation of EVA-based biaxially oriented heat-shrinkable film is that the plastic orientation strength of EVA films is relatively low compared with certain other thermoplastic materials as for example polyethylene. Because of its molecular structure, EVA has relatively low strength in the primary tube form when reheated to orientation temperatures as for example 68°-84° C. As a result, EVA based biaxially oriented heat-shrinkable film is subject to bubble breaks and process interruptions, which can result in a relatively high waste rate.

Certain polyethylenes may be used to manufacture biaxially oriented heat-shrinkable films, and their plastic orientation strength is substantially higher than EVA. Unfortunately their heat shrink properties are inferior to EVA. By far the best heat shrink properties in the polyethylene family are achieved with very low density polyethylene (VLDPE). Although the heat shrink properties of VLDPE approach those of EVA, there is a significant difference and loss of shrink if VLDPE is substituted for EVA in the production of biaxially oriented heat-shrinkable films to achieve higher plastic orientation strength. Moreover it has been determined that the shrink and plastic orientation properties of EVA and VLDPE blends are approximately linear. That is, the shrink and plastic orientation properties of biaxially oriented heat-shrinkable films comprising 50% EVA-50% VLDPE are approximately mid-way between those of the pure components.

An object of this invention is to provide an improved biaxially oriented heat-shrinkable film containing EVA and VLDPE, which has machine direction (MD) and transverse direction (TD) shrink properties similar to those of a pure EVA film.

Another object is to provide such a film having plastic orientation properties similar to those of a pure VLDPE-film.

Still another object is to provide a biaxially oriented heat-shrinkable film containing EVA and VLDPE as principal components, having the high shrink properties of a pure EVA film but also the improved plastic orientation strength properties of a pure VLDPE film.

A further object is to provide an improved method for manufacturing a biaxially oriented heat-shrinkable film containing EVA and VLDPE wherein the biaxial orientation is achieved by bubble expansion, but wherein the strength of the bubble is similar to that of a pure VLDPE bubble, and wherein the method imparts biaxial heat shrink properties similar to those of EVA.

Other objects and advantages of this invention will be apparent from the ensuing disclosure and appended claims.

As will be explained and demonstrated hereinafter in more detail, the biaxially oriented heat-shrinkable film of the present invention overcomes the aforedescribed limitations of EVA and VLDPE heat-shrinkable films and provides the most desired properties of each in a single film, i.e. the plastic orientation strength of VLDPE and the high MD and TD shrink properties of EVA. At the same time the instant film has physical properties which on balance are at least as favorable as presently used films employing EVA/VLDPE blends.

This comparison has been made between both nonirradiated and irradiated films.

As used herein, "heat-shrinkable" means that the film has at least 10% free shrink measured at 90° C. in at least one direction, i.e. machine or transverse, in accordance with ASTM D-2732.

SUMMARY OF THE INVENTION

One aspect of this invention relates to a biaxially oriented heat-shrinkable film comprising a blend of a polyethylene member selected from the group consisting of VLDPE and LLDPE or a mixture thereof, ethylene alpha-olefin plastomer copolymer of density below about 0.90 g/cm$^3$ and ethylene vinyl acetate as major components. The term "ethylene alpha-olefin plastomer" is described further hereinbelow. As between the polyethylene and ethylene vinyl acetate, polyethylene comprises between about 35 and about 60 wt. % of the total and ethylene vinyl acetate comprises between about 40 and about 65% of the total. The ethylene alpha-olefin plastomer copolymer comprises between about 10 and about 20 wt. % of the total weight of the three component blend. The plastomer preferably comprises between about 13 and 17 wt. % of the three component blend. As between the polyethylene and EVA, polyethylene preferably comprises between about 45 and 55 wt. % of the two component total.

The aforedescribed film may be a monolayer wherein the three component blend comprises the entire film. Alternatively this film may comprise one or more layers of a multilayer film. By way of example, the three component blend may comprise either or both the first and second outer layers on either side of a three layer film wherein the core layer between these layers is an oxygen barrier material.

Another aspect of this invention relates to a method for manufacturing a biaxially oriented heat-shrinkable plastic film wherein a primary tube is extruded, cooled, reheated and stretched in the machine direction and inflated in the transverse direction by internal gas to form a bubble, then collapsed and withdrawn as biaxially oriented thinner film. The improvement comprises forming the primary tube from a three component blend of major constituents. These comprise a polyethylene member selected from the group consisting of VLDPE and LLDPE or a mixture thereof, ethylene alpha-olefin plastomer copolymer of a density below about 0.90 g/cm$^3$, and ethylene vinyl acetate. As between the polyethylene and ethylene vinyl acetate total, the polyethylene comprises between about 35 and about 60 wt. % of the total, and ethylene vinyl acetate comprises between about 65 and about 40 wt. % of the weight of the total. The ethylene alpha-olefin plastomer comprises between about 10 and 20 wt. % of the total weight of the three component blend.

DESCRIPTION OF THE DRAWINGS

FIGS. 1-4 illustrate in graphic form, various properties of films of the present invention.

DETAILED DESCRIPTION OF THE INVENTION

Figure 3:
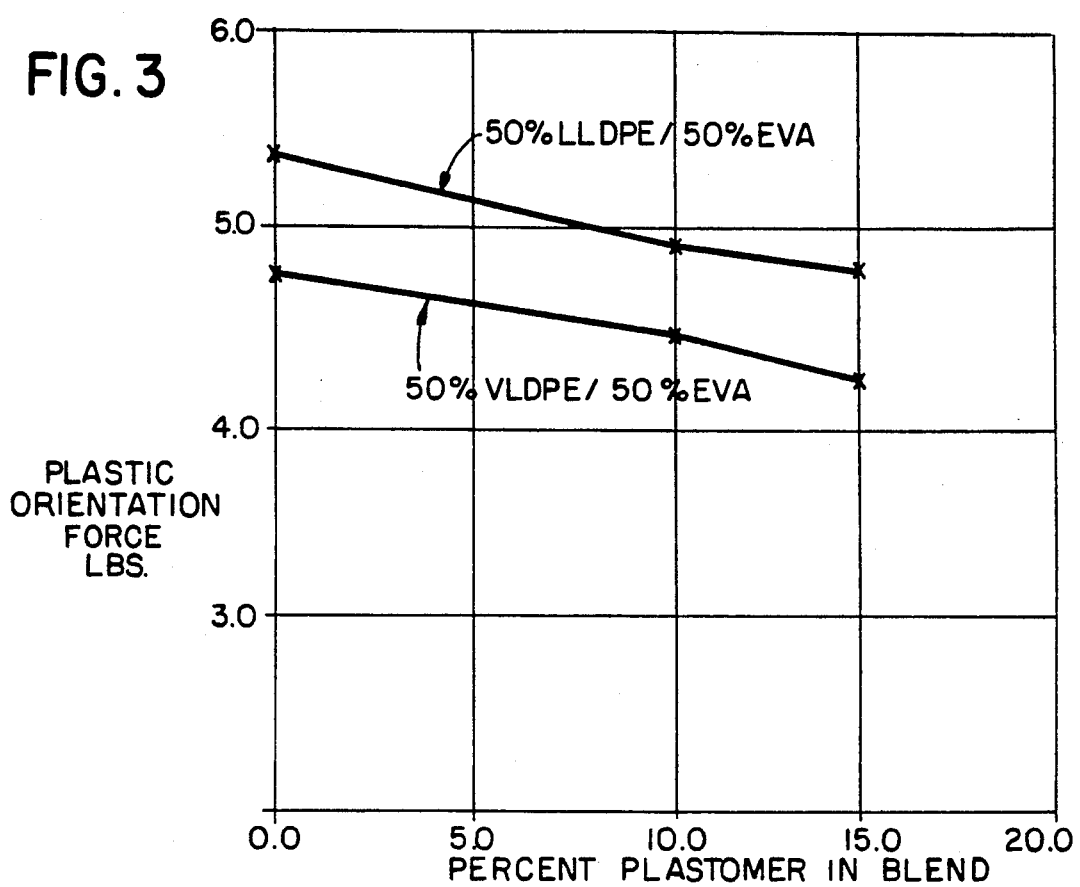

Very low density polyethylene (hereinafter VLDPE) is also called ultra low density polyethylene (ULDPE) and comprises copolymers of ethylene with alpha-olefins, usually 1-butene, 1-hexene or 1-octene, and in some instances terpolymers, as for example of ethylene, 1-butene and 1-octene. As used herein VLDPE also includes terpolymers of ethylene and higher alpha-olefin comonomers. VLDPE's have lower densities than, and are a different class of materials from linear low density polyethylene (LLDPE) and are recognized by those skilled in the art to range between about 0.86 and about 0.914 g/cm$^3$. A process for making VLDPE's is described in European Patent Document publication number 120,503 whose text and drawing are hereby incorporated by reference into the present document.

As for example described in U.S. Pat. Nos. 4,640,856 and 4,863,769, VLDPEs are capable of use in biaxially oriented films which have superior properties to comparable films with LLDPE's. These superior properties include higher shrink, higher tensile strength and greater puncture resistance.

VLDPE's are commercially available in dry resin form either as powder or granules, and for example manufactured and sold by Union Carbide Corporation and Dow Chemical Corporation.

Linear low density polyethylene (LLDPE) has densities in the range of between about 0.915 and about 0.930 g/cm$^3$. As described by Dr. Stuart J. Kurtz of Union Carbide (which manufactures both VLDPE and LLDPE) in the publication "Plastics and Rubber International" April 1986, Vol. II, No. 2, on pages 34-36, the linear structure and lack of long chain branching in both LLDPE and VLDPE arise from their similar polymerization mechanisms. In the low pressure polymerization of LLDPE, the random incorporation of alpha-olefin comonomers produces sufficient short-chain branching to yield densities in the above-stated range. The even lower densities of VLDPE resins are achieved by adding more comonomer, which produces more short-chain branching than occurs in LLDPE, and thus a lower level of crystallinity.

VLDPE provides substantially higher shrink and other superior properties compared to LLDPE. Accordingly VLDPE is the preferred polyethylene in the practice of this invention.

Ethylene alpha-olefin copolymers are also manufactured with elastomeric properties and are hereinafter referred to as "ethylene alpha-olefin plastomers". Some of these have densities in the same range as VLDPE's, but have greatly different physical properties due to differences in manufacturing processes. For example, it appears that ethylene alpha-olefin plastomers and VLDPE are manufactured with different catalyst systems. One manufacturer of these materials is Mitsui Petrochemicals Ltd., and they sell ethylene-butene plastomer copolymers under the name "Tafmer". It is interesting to note that Mitsui manufacturers and sells both ethylene alpha-olefin plastomers and materials they characterize as VLDPE's, and the two types of materials are manufactured in different plants using different catalyst systems. Mitsui describes the differences between the two types of ethylene alpha-olefin copolymers in the "Proceedings of Future-Pak '91, Ninth International Ryder Conference on Food Packaging Innovations", Oct. 2-4, 1991. As used herein, ethylene alpha-olefin plastomers include terpolymers of ethylene and higher alpha-olefin comonomers. According to U.S. Pat. No.4,469,753 Tafmers are copolymers of butene-1.

As hereinafter discussed in detail, VLDPE and ethylene alpha-olefin plastomer may be compared in terms of crystallinity, Vicat softening points, molecular weight/size distribution, and tensile properties. For purposes of this invention, they are broadly distinguished on the basis of at least the following properties in the resin form:

| Property | VLDPE | Ethylene Alpha Olefin Plastomers |
|---|---|---|
| Melting Point | At least about 90° C. | Below about 90° C. if any melting point |
| Molecular weight/size distribution (ASTM D-3593-80) | Above about 3 | Below about 3 |
| Crystallinity (measured by DSC) | At least two crystalline phases with the dominant phase having a melting point of between about 100° C. and about 125° C. | Entire crystalline phase melts below about 90° C. |

Crystallinity

A manufacturer of both plastomer-type ethylene alpha-olefin copolymers and VLDPE reports that in general, the plastomers have lower crystallinity than VLDPE copolymers. In particular, Mitsui Petrochemical Industries Ltd. reports that their Tafmers have lower crystallinity than their VLDPE materials (ref: "Future-Pak '91, Ninth International Ryder Conference on Food Packaging Innovations, Oct. 2-4, 1991, page 314). Mitsui also advises that for comparable density, their Tafmer-type plastomer ethylene alpha-olefin copolymer has 10-15% crystallinity whereas their VLDPE has 25-35% crystallinity.

Differential Scanning Colorimetry (DSC) is commonly used to measure the amount of crystallinity in a plastic sample, and it also reveals the nature of this crystallinity. As for example determined in a procedure similar to ASTM D-3418, a DSC is performed by exposing a sample of the plastic to a constant rate of heating, i.e. 50° C. per minute and a DuPont 9000 brand differential scanning colorimeter. When the temperature of a sample reaches the melting point of a crystalline region, the continued application of heat causes the crystalline fraction to melt, and during this process the sample temperature remains constant. After the crystalline region has melted, the sample temperature once again begins to rise.

DSC measurements were performed on two types of VLDPE's: the Union Carbide 1137 (an ethylene-butene copolymer) with 0.906 density and the Dow Attane 4001 (an ethylene-octene copolymer) with 0.912 density. The same type measurement was performed with Tafmer A-1085. Each of these ethylene alpha-olefin copolymers has some crystallinity but the crystalline nature of the ethylene alpha-olefin plastomer and the VLDPE copolymers is entirely different.

The entire crystalline phase of the ethylene alpha-olefin Tafmer A-1085 plastomer melts between about 55° and 85° C., and this melting point range is consistent with the crystalline phase being made up of an ordered butene-ethylene copolymer. In contrast, the VLDPE copolymers have at least two crystalline phases with the dominant phase being that of a high temperature melting point, in each instance being in the range of about 117°-125° C. This is typical of that displayed by an ethylene homopolymer, and essentially the plastic could be regarded as a composite of two copolymers: a higher ethylene alpha-olefin-ethylene copolymer and an ethylene copolymer.

The melting points of representative VLDPE, LLDPE and plastomeric ethylene alpha-olefin copolymers are summarized in Table A.

TABLE A

| Ethylene Alpha-Olefin Melting Points (°C.) | |
|---|---|
| Type Compound and Manufacturer | MP (°C.) |
| Dow 2045 LLDPE | 121 |
| Union Carbide 1137 VLDPE | 117 |
| Union Carbide 1085 VLDPE | 117 |
| Union Carbide 1092 VLDPE | 121 |
| Union Carbide 1063 VLDPE | 124 |
| Union Carbide 1064 VLDPE | 125 |
| Dow Attane 4001 VLDPE | 121 |
| Dow Attane 4003 VLDPE | 107/124 (two peaks) |
| Mitsui Tafmer A-4085 plastomer | 71 |
| Mitsui Tafmer A-4090 pastomer | 85 |
| Mitsui Tafmer A-1085 plastomer | 71 |

Table A demonstrates the substantial difference in melting points of VLDPE and LLDPE as compared to ethylene alpha-olefin copolymer plastomers. More particularly, ethylene alpha-olefin copolymer plastomers have melting points below about 90° C. and VLDPE materials have melting points above about 90° C. Preferably the plastomers have melting points below about 85° C.

Based on the foregoing, preferred VLDPE copolymers have a crystalline melting point between about 100° C. and about 125° C. Resins having a crystalline melting point above about 125° C. are, with rising temperature, increasingly difficult to process as biaxially oriented heat-shrinkable food packaging stretch films. VLDPE resins useful in the outer layer blends of the inventive film preferably have a crystalline melting point between about 115° C. and about 125° C.

Vicat Softening Point

VLDPE materials tend to be less flexible and harder to penetrate than plastomer-type ethylene alpha-olefins, which tend to be more flexible and softer. This is illustrated by comparing Vicat softening points for the two kinds of copolymers. As defined in ASTM 1525, Vicat softening point is the temperature at which a flat-ended needle of 1-mm$^2$ circular cross section will penetrate a thermoplastic specimen to a depth of 1 mm. under a specified load using a selected uniform rate of temperature rise. Vicat softening points for various VLDPE and LLDPE materials, and plastomer-type ethylene alpha-olefins have been reported by the resin manufacturers and are summarized in Table B (Vicat Softening Points) as follows.

TABLE B

| Vicat Softening Points (°C.) | |
|---|---|
| Type Compound and Manufacturer | VSP (°C.) per ASTM-1525 |
| Dow 2048 LLDPE | 100 |
| Union Carbide 1085 VLDPE | 45 |
| Union Carbide 1137 VLDPE | 80 |
| Union Carbide 1063 VLDPE | 93 |
| Union Carbide 1064 VLDPE | 90 |
| Union Carbide 1569 VLDPE | 94 |
| Dow Attane 4001 VLDPE | 95 |
| Dow Attane 4003 VLDPE | 80 |
| Dow Attane 4004 VLDPE | 92 |
| Mitsui Tafmer A-1085 Plastomer | 58 |
| Mitsui Tafmer A-4085 Plastomer | 54 |
| Mitsui Tafmer A-4090 Plastomer | 65 |
| Mitsui Tafmer A-20090 Plastomer | 60 |

It will be noted that Union Carbide 1085 has a much lower Vicat softening point than other VLDPE's but is still considered a VLDPE because of its other properties. Based on the foregoing and for purposes of this invention, VLDPE and LLDPE-type ethylene alpha-olefin copolymers preferably have Vicat softening points of at least about 68° C., and most preferably between about 78° C. and about 100° C. Conversely, plastomer-type ethylene alpha-olefin copolymers have Vicat softening points below about 68° C. and most preferably between about 50° C. and about 65° C.

Molecular Weight/Size Distribution

Ethylene alpha-olefin copolymers may be partially characterized by their weight average molecular weight (Mw) which is determined by multiplying the weight of each chain of a given number of repeat units by the number of such chains and dividing by the total weight of chains. Ethylene alpha-olefin copolymers may also be partially characterized by a number average molecular weight (Mn), which is derived from the total weight of polymer molecules divided by the total number of molecules. When both of these are known, they can be used to characterize the shape of the molecular weight distribution curve for the copolymer, i.e., the number of polymer chains in a molecular weight interval as the ordinate and the molecular weight as the abscissa. Qualitatively, a high Mw/Mn connotes a wide distribution of molecular weights whereas a low Mw/Mn connotes a narrow distribution. Mw/Mn can be measured by several different techniques, but as used herein the gel permeation chromatography ("GPC") procedure outlined in ASTM D-3593-80 is used.

In general, relatively narrow Mw/Mn distribution (and low ratio) permits sharper control of physical properties and superior optical properties, i.e. relatively high gloss and low haze. However, relatively low Mw/Mn ratio value polymers are also difficult to process. More particularly, the specific ethylene alpha-olefin plastomers known to applicant as useful in this invention are characterized by relatively narrow molecular weight distribution and Mw/Mn values below about 3. They are relatively difficult to process into films by melt extrusion. Although they can be melt extruded into blown film, applicant has been unable to prepare biaxially oriented heat-shrinkable film from these materials such as the aforedescribed Tafmer A-4085.

All of the specific VLDPE copolymers known to applicant and available in commercial quantities as of the application filing data have substantially wider molecular weight distribution and higher Mw/Mn values than the ethylene alpha-olefin plastomers known to applicant as being useful in practicing this invention. As such, the VLDPE copolymers have higher impact strength, tensile strength, abrasion resistance and better processing characteristics. For example, by themselves these VLDPEs may be melt extruded into a primary tube and then biaxially oriented into a heat-shrinkable tube. The molecular weight/size distribution ratios for representative commercially available ethylene alpha-olefin copolymers are set forth in the following Table C (Molecular Weight/Size Distributions). Unless indicated otherwise, these values were measured by the GPC procedure of ASTM D-3593-80.

TABLE C

| Molecular Weight/Size Distributions | |
|---|---|
| Type Compound and Manufacturer | Mw/Mn |
| Dow 2045 LLDPE | 4.17 (125,000/30,000) |
| Union Carbide 1085 VLDPE (0.885 density, 0.8 MI) | 3.6 (118,000/33,000) |
| Union Carbide 1137 VLDPE (0.900 density, 1.0 MI) | 4.9 (125,000/25,700) |
| Union Carbide 1192 VLDPE (0.912 density, 0.19 MI) | 12.2 (196,900/16,080) |
| Union Carbide 1096-2 VLDPE (0.912 density, 0.38 MI) | 7.2 (137,000/19,110) |
| Dow 4001 VLDPE | 5.1 (110,600/21,680) |
| Mitsui 0.896 density VLDPE | 4.0* |
| Mitsui 0.907 density VLDPE | 3.2* |
| Mitsui Tafmer A-4090 Plastomer | 2.0* |
| Mitsui Tafmer A-4085 Plastomer | 2.35 (108,000/46,000) |
| Mitsui Tafmer A-1085 Plastomer | 2.00 (160,000/80,000) |

*Reported by manufacturer in the aforementioned "Proceedings of Future-Pak '91", page 314. Procedure for measuring Mw/Mn not identified.

Based on the commercially available ethylene alpha-olefins reported in Table C, it appears that the plastomer type has an Mw/Mn value of below about 3 whereas the LLDPE and VLDPE copolymers have Mw/Mn values above about 3. More particularly, the known plastomer type ethylene alpha-olefins have Mw/Mn values below about 2.5 whereas the commercially available VLDPE materials preferably have Mw/Mn values of at least about 5. However, it may be possible to manufacture VLDPE and LLDPE materials having relatively narrow molecular weight distributions and Mw/Mn value below about 3.

Tensile Properties

In general, known VLDPE and LLDPE materials have higher tensile strengths than comparable ethylene alpha-olefin plastomers. That is, if the two types of copolymers were prepared from the same comonomer and using the same catalyst system, the VLDPE or LLDPE would have higher crystallinity and density, hence higher tensile strength. Mitsui, a manufacturer of both plastomers and VLDPE, reports the following values for Young's Modulus (the modulus of elasticity), which is the ratio of stress to strain below the proportional limit of a material, as summarized in Table D.

TABLE D

| Material | Young's Modulus Kg/cm$^2$ |
|---|---|
| Tafmer A-4085* | 400 |
| Tafmer A-20090* | 600 |
| VLDPE (0.896 density)** | 800 |
| VLDPE (0.907 density)** | 1820 |

*"Tafmer", publication of Mitsui Petrochemical Ind, Ltd. page 12
**"Proceedings of Future-Pak '91", page 314

Another difference in the tensile properties of ethylene alpha-olefin plastomers and VLDPE or LLDPE materials is that the former do not have a definitive yield point whereas VLDPE and LLDPE materials generally possess such a point. As defined in ASTM D-638, yield point is the first point on the stress-strain curve at which an increase in strain occurs without an increase in stress. ASTM D-638 also defines yield strength as the stress at which a material exhibits a specific limiting deviation from the proportionality of stress to strain, and unless otherwise specified, that stress will be the stress at the yield point. In the aforementioned "Future-Pak '91" publication by Mitsui, the following information is reported on page 314 for yield strengths: Tafmer A-4090 no value reported, VLDPE 0.896 density is 42 kg/cm$^2$, and VLDPE 0.907 is 84 kg/cm$^2$. This indicates that in view of a manufacturer of both ethylene alpha-olefin plastomers and VLDPE, the former do not have a yield point but instead break when sufficient stress is applied. In contrast, Mitsui indicates that its VLDPE materials have definite yield points.

The Mitsui results were qualitatively confirmed in a series of tests in which samples of various resins were prepared according to the procedure for thin plastic sheeting outlined in ASTM 882-90. The dimensions of these resin samples were as follows: 1 inch width, 4 inches long and 7-9 mils thick. These samples were tested for yield point and tensile strength following Method A, employing a constant rate of separation of the grips initially holding the ends of specimen 2 inches apart, this rate being 20 inches/minute. Five samples of each material were tested and the results averaged. The results of these tests are summarized in Table E (Yield Strength).

TABLE E

Yield Strength

| Type Compound and Manufacturer | Average Yield Strength (psi) |
|---|---|
| Dow Attane XU61512.21 VLDPE (0.901 density) | 1020 |
| Dow Attane XU61520.01 VLDPE (0.912 density) | 1329 |
| Union Carbide 1137 VLDPE (0.905 density) | 1121 |
| Union Carbide 1192 VLDPE (0.912 density) | 1323 |
| Union Carbide 1085 VLDPE (0.885 density) | No yield point |
| Mitsui Tafmer A-4085 Plastomer (0.88 density) | No yield point |
| Mitsui Tafmer A-1085 Plastomer (0.88 density) | No yield point |

It will be noted that Union Carbide type 1085 VLDPE did not have a yield point, unlike the other VLDPEs but like the ethylene alpha-olefin copolymer plastomers. However, it is classified as a VLDPE because of its other properties including a melting point of 117° C.

Suitable VLDPE and LLDPE materials for practicing this invention include those manufactured by Dow Chemical Company and Union Carbide Corporation, and having the following physical properties in the resin form according to the manufacturers, as summarized in Table F (VLDPE and LLDPE Physical Properties):

TABLE F

VLDPE and LLDPE Physical Properties

| Type | Manufacturer | Property | Units | Value |
|---|---|---|---|---|
| 4001 | Dow VLDPE (ethylene-octene copolymer) | Melt Index (D-1238) | g/10 min | 1.0 |
| | | Density (D-792) | g/cc | 0.912 |
| | | Tensile Yield (D-638) | psi | 1200 |
| | | Ultimate Tensile (D-638) | psi | 3500 |
| | | Ult. Elongation (D-638) | % | 850 |
| | | Vicat Soften. Pt. (D-1525) | °C. | 95 |
| | | Mw/Mn (ASTM D-3593) | none | 5.1 (110,600/21,680) |
| 4003 | Dow VLDPE (ethylene-octene copolymer) | Melt Index (D-1238) | g/10 min | 0.8 |
| | | Density (D-792) | g/cc | 0.905 |
| | | Tensile Yield (D-638) | psi | 950 |
| | | Ultimate Tensile (D-638) | psi | 3200 |
| | | Ult. Elongation (D-638) | % | 800 |
| | | Vicat Soften. Pt. (D-1525) | °C. | 80 |
| 1137 | Union Carbide VLDPE ethylene-butene copolymer) | Melt Index (D-1238) | g/10 min | 1.0 |
| | | Density (D-792) | g/cc | 0.905 |
| | | Tensile Yield (D-638) | psi | 2800 |
| | | Ultimate Tensile (D-638) | psi | — |
| | | Ult. Elongation (D-638) | % | 1720 |
| | | Vicat Soften. Pt. (D-1525) | °C. | 80 |
| | | Mw/Mn (ASTM D-3593) | none | 4.9 (126,000/25,700) |
| 1192 | Union Carbide VLDPE ethylene-butene hexene terpolymer) | Melt Index (D-1238) | g/10 min | 0.19 |
| | | Density (D-792) | g/cc | 0.912 |
| | | Tensile Strength (D-882) | psi | 7100 (MD) 5000 (TD) |
| | | Ult. Elongation | % | 400 (MD) |

TABLE F-continued

| | | VLDPE and LLDPE Physical Properties | | |
|---|---|---|---|---|
| Type | Manufacturer | Property | Units | Value |
| | | (D-882) | | 760 (TD) |
| | | Vicat Soften. Pt. (D-1525) | °C. | "low eighties" reported by mfg. |
| | | Mw/Mn (ASTM D-3593) | none | 12.2 (196,900/16,08) |
| 2045 | Dow LLDPE (ethylene-octene copolymer | Melt Index (D-1238) | g/10 min | 1.0 |
| | | Density (D-792) | g/cc | 0.920 |
| | | Tensile Yield (D-638) | psi | 1800 |
| | | Ultimate Yield (D-638) | psi | 3800 |
| | | Ult. Elongation | % | 1000 |
| | | Vicat Soften. Pt. (D-1525) | °C. | 100 |
| | | Mw/Mn | none | 4.17 (125,000/30,000) |

Suitable ethylene alpha-olefin plastomer copolymers include those manufactured by Mitsui Petrochemical Industries, Ltd. under the name Tafmer, as summarized in Table G (Ethylene alpha-olefin Plastomers Properties).

TABLE G

| | | Ethylene Alpha-Olefin Plastomer Properties | | |
|---|---|---|---|---|
| Type | Manufacturer | Property | Units | Value |
| A-4085 | Mitsui | Melt Index (D-1238) | g/10 min (190° C.) | 3.6 |
| | | Density (D-1505) | g/cc | 0.88 |
| | | Vicat Soften Pt. (D-1525) | °C. | 54 |
| | | Tensile Strength At Break (515 K 6301) | kg/cm² | 270 |
| | | Elongation At Break (515 K 6301) | % | 800 |
| | | Mw/Mn | none | 2.35 |
| A-4090 | Mitsui | Melt Index (D-1238) | g/10 min (190° C.) | 3.6 |
| | | Density (D-1505) | g/cc | 0.89 |
| | | Vicat Soften Pt. (D-1525) | °C. | 60 |
| | | Tensile Strength At Break (515 K 6301) | kg/cm² | 320 |
| | | Elongation At Break (515 K 6301) | % | 700 |
| | | Mw/Mn | none | 2.0 |
| A-1085 | Mitsui | Melt Index (D-1238) | g/10 min (190° C.) | 1.4 |
| | | Density (D-1505) | g/cc | 0.885 |
| | | Vicat Soften Pt. (D-1525) | °C. | 58 |
| | | Tensile Break At Break (515 K 6301) | kg/cm² | 340 |
| | | Elongation At Break (515 K 6301) | % | 710 |
| | | Mw/Mn | none | 2.0 |

Although not essential in the practice of this invention, it may be desirable to cross-link (one or more layers if the film is the multilayer type) the inventive film for improved abuse and/or puncture resistance and other physical characteristics. This for example may be accomplished by irradiation using high energy electrons, ultra violet radiation, x-rays, beta particles and the like. The irradiation source can be any electron beam generator operating in a range of about 150 kilovolts to about 6 megavolts with a power output capable of supplying the desired dosage. The voltage can be adjusted to appropriate levels which may be for example 1,000,000 or 2,000,000 or 3,000,000 or 6,000,000 or higher or lower. Many apparatus for irradiating films are known to those of skill in the art. The irradiation is usually carried out at a dosage up to about 20 MR, typically between about 1 MR and about 20 MR, with a preferred dosage range of about 2 MR to about 12 MR. Irradiation can be carried out conveniently at room temperature, although higher and lower temperatures, for example, 0° C. to 60° C. may be employed.

Processwise, irradiation can be applied to the entire film if the monolayer type, or if the multilayer type to a single substrate layer such as the first outer layer and prior to biaxial orientation if the primary multilayer film is prepared by coating lamination. This type of irradiative cross-linking is for example described in the aforementioned U.S. Pat. No. 3,741,253. Alternatively, if the film is multilayer and simultaneously coextruded, it may be preferable to irradiate the entire multilayer film, and for maximum efficiency this should be done after biaxial orientation at a dosage level below about 8 MR, as for example described in U.S. Pat. No. 4,714,638.

Cross-linking may also be accomplished chemically through utilization of peroxides, as is well known to those of skill in the art. A general discussion of cross-linking can be found at pages 331 to 414 of volume 4 of the Encyclopedia of Polymer Science and Technology, Plastics, Resins, Rubbers, Films published by John Wiley & Sons, Inc. and copyrighted in 1966. This document has a Library of Congress Catalog Card Number of 64-22188.

Unless otherwise noted, the resins utilized in the present invention are generally commercially available in pellet form and, as generally recognized in the art, may be melt blended or mechanically mixed by well known methods using commercially available equipment including tumblers, mixers or blenders. Also, if desired, well known additives such as processing aids, slip agents, antiblocking agents, pigments, etc., and mixtures thereof may be incorporated into the film, by blending prior to extrusion. The resins and any additives are introduced to an extruder (generally one extruder per layer) where the resins are melt plastified by heating and then transferred to an extrusion (or coextrusion) die for formation into a tube. Extruder and die temperatures will generally depend upon the particular resin or resin containing mixtures being processed and suitable temperature ranges for commercially available resins are generally known in the art, or are provided in technical bulletins made available by resin manufacturers. Processing temperatures may vary depending upon other process parameters chosen. In extrusion of the EVA-ethylene alpha-olefin plastomer-VLDPE blends of the present invention, barrel and die temperatures, for example, may range between about 300° and about 350° F. However, depending upon such factors as other resins which may be employed, the manufacturing process used and particular equipment and other process parameters utilized, variations are expected. Actual process parameters including process temperatures will be set by one skilled in the art without undue experimentation.

Advantageously, a preferred embodiment of the inventive heat-shrinkable film will have a maximum extractable portion of 5.5 percent by weight of polymer in n-hexane at 50° C. for 2 hours as further described below. This 5.5 weight percent represents the desired maximum n-hexane extractable limit for olefin copolymers of the type employed by the present invention for use in articles that contact food except for articles used for packing or holding food during cooking. Beneficially, the maximum extractable portion as described above will be 2.6 percent in an especially preferred embodiment of the inventive film suitable for use in articles used in packing or holding food during cooking. The above maximum extractable values correspond to current limits for a class of resins intended for use in contact with food as set forth and described by the U.S. Food & Drug Administration in 21 CFR 177.1520 (which description is hereby incorporated in its entirety by reference).

Plastic Orientation Force

A laboratory technique was used which predicts the extrusion efficiency of a given polymeric resin or blend of resins, based on plastic orientation force. This technique also provides mechanically uniaxially stretched samples which can be used to measure hot water shrink properties. Tests using the same resin or blends of resins in biaxially oriented films demonstrated that the hot water shrink measurements are correlatable with the MD and TD shrink at 90° C.

In this laboratory technique, resins are melt-blended and then pressed into 10 mil thick sheets or "plaques". A strip from the latter is secured at opposite ends to the jaws of an Instron pull tester placed in a controlled temperature environment, and pulled at 180° F. The stress-strain curve generated by pulling the heated strip defines its orientation force, and based on film orientation tests, correlates well with the double bubble biaxial orientation efficiency.

More specifically, the plastic orientation force test procedure is as follows:

1. The resin particles are milled in a heated, double roll mixing apparatus at about 170° C. for at least 15 minutes, i.e. until a thoroughly melt blended slab of the multiple components is obtained.

2. The plaques are prepared from a slab of the aforedescribed melt blend by heated compression in a hydraulic press applying 180 psi at 160° C. for a period of one minute. The target thickness of the plaque is 10 mils, and the area to be stretched is 1 inch×1 inch.

3. A test strip 3 inches long and 1 inch wide is cut from the plaque and opposite ends are secured in the gripping jaws of a pull tester such as the Instron Type 4501 having a controlled temperature chamber. The test strip is positioned so that the longitudinal distance between the outer ends of the opposite jaws is 1 inch.

4. The pull tester is provided with a 10 or 20 pound load cell and set for a draw rate of 40 inches/minute. That is, one jaw will move away from the other fixed jaw at a speed needed to provide this draw rate. The chamber temperature is set for 180° F. and the sample strip is allowed 10 minutes to achieve this temperature before initiating the test wherein the force vs. strain relationship is recorded on a chart.

5. The strip sample is pulled at the 40 inches/minute rate to a total length of 9 inches. The plastic orientation force was recorded as force (recorded in pounds) vs. strain on a continuous strip chart. The force reported was at the point when the jaws were 3 inches apart (200% strain). After the jaws were 9 inches apart, the chamber door was opened immediately and the sample rapidly cooled by a hand-held blow dryer set on "cold".

6. The cooled sample is removed and measured. In general, the final thickness of the stretched sample ribbons was about 4.5 mils and the final width was about 0.4 inch.

Free Shrink

Free shrink at 90° C. was measured for each of the aforedescribed stretched sample strips as follows: Four test specimens were cut from a given sample of stretched film. The specimens were cut to 10 cm. in the stretched direction by about 1 cm. in the unstretched direction. Each specimen was completely immersed for 5 seconds in a 90° C. water bath. The distance between the ends of the shrunken specimen in the stretched direction was measured. The difference in the measured distance for the shrunken specimen and the original 10 cm. was multiplied by ten to obtain the percent of shrinkage in the stretched direction for the specimen. The shrinkage for the four specimens was averaged.

EXAMPLE 1

In this series of tests, the resins were Dow's Type 4001 VLDPE, Union Carbide's Type 6833 EVA (VA content 10%), and Mitsui's Tafmer Type A1085 ethylene alpha-olefin plastomer. The results of the aforedescribed resin plastic orientation force and hot water shrink tests are summarized in Table H (Plastic Orientation Force and Shrink).

TABLE H

| Plastic Orientation Force and Shrink | | | |
|---|---|---|---|
| Sample No. | Constituents (wt. %) | Force at 3 inches (lbs) | Stretch Direction Shrink at 90° C. (%) |
| 1 | 95.6% VLDPE 4.4% p.a.(a) | 5.0 | 40 |
| 2 | 97.5% EVA 2.5% p.a.(b) | 3.3 | 58 |
| 3 | 75% EVA 25% VLDPE | 3.6 | 56 |
| 4 | 63.75% EVA 21.25% VLDPE 15% Plastomer | 3.1 | 63 |
| 5 | 70% EVA 30% VLDPE | 3.9 | 54 |
| 6 | 63% EVA 27% VLDPE 10% Plastomer | 3.2 | 58 |
| 7 | 59.5% EVA | 3.1 | 62 |

TABLE H-continued

Plastic Orientation Force and Shrink

| Sample No. | Constituents (wt. %) | Force at 3 inches (lbs) | Stretch Direction Shrink at 90° C. (%) |
|---|---|---|---|
| 8 | 25.5% VLDPE 15% Plastomer 56% EVA | 2.9 | 63 |
| 9 | 24% VLDPE 20% Plastomer 50% EVA | 4.1 | 49 |
| 10(c) | 50% VLDPE 45% EVA | 3.9 | 55 |
| 11(c) | 45% VLDPE 10% Plastomer 42% EVA | 3.8 | 59 |
| 12(c) | 42.5% VLDPE 15% Plastomer 40% EVA | 3.3 | 59.5 |
| 13 | 40% VLDPE 20% Plastomer 45% EVA | 4.5 | 48 |
| 14(c) | 55% VLDPE 40.5% EVA | 4.2 | 54.5 |
| 15(c) | 49.5% VLDPE 10% Plastomer 38.25% EVA | 3.9 | 54 |
| 16(c) | 46.75% VLDPE 15% Plastomer 36% EVA | 3.7 | 59 |
| 17 | 44% VLDPE 20% Plastomer 40% EVA | 5.2 | 49 |
| 18(c) | 60% VLDPE 36% EVA | 4 | 53 |
| 19(c) | 54% VLDPE 10% Plastomer 34% EVA | 3.6 | 57 |
| 20(c) | 51% VLDPE 15% Plastomer 32% EVA | 3.3 | 58 |
| 21(d) | 48% VLDPE 20% Plastomer 100% Plastomer(d) | — | — |

(a)Processing aid was Ampacet type 10919 comprising 97% LLDPE and 3% Dynamar ® polymer processing additive (a fluorocarbon additive) manufactured by 3M Company.
(b)Slip additive was Ampacet type 10926 comprising 98% LLDPE and 2% oleamide.
(c)Formulation in baxially oriented heat-shrinkable film is an emboiment of this invention.
(d)Plastomer in every instance is Tafmer A-1085. Sample 21 melted at 180° F. and no measurements were possible.

EXAMPLE 2

Another series of plastic orientation force and hot water shrink tests were performed to compare several different types of ethylene alpha-olefin plastomer copolymers at the same concentration (15 wt. %) in three component blends with identical mixtures of 42.5 wt. % EVA (10% VA manufactured and sold by Union Carbide as Type 6833) and 42.5 wt. % VLDPE (type XU 61520.02 manufactured by Dow Chemical and having a density of 0.912). The ethylene alpha-olefins were Mitsui's Tafmer A-4085 having a relatively low molecular weight range, Mitsui's Tafmer A-1085 having a relatively medium molecular weight range, Mitsui's Tafmer TX 269 having a relatively high molecular weight range, and Mitsui's Tafmer P-0680 having a relatively medium molecular weight range. With the exception of Tafmer P-0680 which reportedly has no crystallinity, the other Tafmer types are reported by Mitsui as having 10–15% crystallinity. Although the test procedure was the same as with Samples 1–21, this Sample 2 series was run at a different time and with a slightly different type of VLDPE. Accordingly the latter should not be quantitatively compared with the former, but the results may be qualitatively compared and are summarized in Table I (Plastomer Orientation Characteristics-Equal VLDPE and EVA).

Mitsui Petrochemicals Ltd. has renumbered its ethylene alpha-olefin plastomer Tafmer TX 269 as Tafmer A 0585, but the original designation will be used hereafter in this specification.

TABLE I

Plastomer Orientation Characteristics - Equal VLDPE an EVA

| Sample No. | Constituents (wt. %) | Force At 3 Inches (lbs.) | Stretch Direction Shrink At 90° C. (%) |
|---|---|---|---|
| 22A | 42.54% EVA 42.5% VLDPE 15% Tafmer A-4085 | 4.36 | 58.5 |
| 22B | 42.5% EVA 42.5% VLDPE 15% Tafmer A-1085 | 4.14 | 59.5 |
| 22C | 42.5% EVA 42.5% VLDPE 15% Tafmer TX 269 | 4.31 | 59.5 |
| 22D | 42.5% EVA 42.5% VLDPE 15% Tafmer P-0680 | 3.86 | 56.5 |
| 22E | 100% Tafmer A-1085 | Melted and sealed jaws together | |

Based on the foregoing, it appears that Tafmer TX 269 provides the most favorable plastic orientation characteristics in the sense that the Sample 22C orientation force and stretch direction shrink values were on balance the highest attained. However the values for the other low crystallinity Samples 22A and 22B were very similar to Sample 22C. However, the noncrystalline ethylene alpha-olefin Sample 22D gave significantly lower results, suggesting that in a preferred embodiment the ethylene alpha-olefin plastomer copolymer has at least some crystallinity. Significantly, because the pure ethylene alpha-olefin plastomer copolymer Sample 22E melted, the plastic orientation force could not be measured.

For purposes of comparison, the same plaque tests were conducted with a formulation containing 42.5% EVA, 42.5% VLDPE and 15% of an ethylene alpha-olefin copolymer manufactured by Exxon Corporation and described as "Exact" type 3010C. The plastic orientation force of this formulation was 4.44 lbs. force (at 3 inches) and the stretch direction stretch was 54.5% at 90° C. This plastic orientation force was slightly higher than for the Tafmer TX 269-containing Sample 22D, but the shrink values for all four Tafmer-containing formulations 22A–D were superior. Exxon Corporation has renumbered its ethylene alpha-olefin copolymer Exact type 3010C as Exact 3027 and reports the following properties: melt index 3.5 g/10 min (D-1238), density 0.900 g/cm$^3$ (D-7921, and a single melting point 92° C. (DSC). Exxon classifies its Exact materials with densities of at least about 0.900 as VLDPE.

EXAMPLE 3

In still another series of the Sample 22 tests, the resin plastic orientation force and hot water shrink values were obtained for blends in which the concentration of EVA was relatively high at 60 wt. % and VLDPE was 40 wt. % of the two component total, but the concentration of Tafmer A-1085 was increased from 0% (Sample 22F), to 10% of the total blend weight (Sample 22G) and finally to 15% of the total blend weight (Sample 22H). The results of this test series are summarized in Table J (Plastic Orientation Characteristics-High EVA Content).

TABLE J

Plastic Orientation Characteristics High EVA Content

| Sample No. | Constituents (wt. %) | Force At 3 Inches (lbs.) | Stretch Direction Shrink At 90° C. (%) |
|---|---|---|---|
| 22F | 60% EVA 40% VLDPE 0% Plastomer | 4.61 | 51 |
| 22G | 54% EVA 36% VLDPE 10% Tafmer A-1005 | 4.31 | 57 |
| 22H | 51% EVA 34% VLDPE 15% Tafmer A-1085 | 4.01 | 61 |

For reasons previously described, these results cannot be quantitatively compared with the Example 1 results, but a qualitative comparison is appropriate. The plastic orientation force and shrink of the 60% EVA-40% VLDPE blends of Samples 22H are similar to the 50% EVA-50% VLDPE blends of Samples 10-12, and provide the same advantages of both high orientation force (characteristic of VLDPE) and high shrink (characteristic of EVA).

The Table I and J data on plastic orientation force and free shrink for the EVA-VLDPE-Tafmer A-1085 system is shown in graph form as FIG. 1 (plastic orientation force as ordinate vs. percent plastomer as abscissa) and FIG. 2 (free shrink as ordinate vs. percent plastomer as abscissa). That is, curves are drawn for blends of VLDPE and EVA as the percent plastomer is increased from 0% to 20 wt. % of the total blend weight, each curve representing a constant blend as between VLDPE and EVA. More particularly, curves are drawn for the following: 25% VLDPE-75% EVA, 30% VLDPE-70% EVA, 40% VLDPE-60% EVA, 50% VLDPE-50% EVA, 55% VLDPE-45% EVA AND 60% VLDPE-40% EVA. In addition, pure or nearly pure component values for VLDPE, EVA and plastomer are include (Samples 1, 2 and 21 respectively). As previously indicated, the 40% VLDPE-60% EVA curves should not be quantitatively compared with the other curves, and for this reason is shown by dotted lines.

FIG. 1 shows that for all VLDPE-EVA blends, the plastic orientation force trends downwardly with increasing plastomer content, but the downward slopes of the curves vary substantially, as does the starting point on the ordinate at 0% plastomer. For example, the 25% and 30% VLDPE curves are in a range of relatively low plastic orientation force, and in fact with blends containing at least about 8% plastomer and higher, the plastic orientation force is below that of relatively weak EVA. However, when the VLDPE content in the two component blend is increased to 40% VLDPE-60% EVA, the downward slope of the curve has decreased sufficiently so that the addition of plastomer significantly improves the orientation force to be higher than 100% EVA at all plastomer contents up to at least 20% plastomer. Moreover, the overall loss in plastic orientation force by the addition of plastomer is considerably lower with at least 40% VLDPE than with lower percent VLDPE content of the VLDPE-EVA total.

As the VLDPE content is further increased to 50% and 55% of the VLDPE-EVA total, the downward slope of the curves remain relatively low and addition of plastomer results in even less reduction of plastic orientation force up to at least 20% plastomer. However, when the VLDPE content is increased to 60% of the VLDPE-EVA total, the downward slope of the plastic orientation force curve has substantially increased as compared to 55% VLDPE-EVA total. For example on an absolute basis, at 15% plastomer Sample 19 (34% EVA, 51% VLDPE) has a value of 3.6 lbs. whereas Sample 15 (38.25% EVA, 46.75% VLDPE) has a value of 3.9 lbs. Accordingly, the increased VLDPE content in the three component blend has unexpectedly reduced the plastic orientation force. Accordingly, the VLDPE content in the biaxially oriented heat-shrinkable film of this invention should not exceed about 60 wt. % of the VLDPE-EVA total. Conversely, the VLDPE content should be at least about 35 wt % of the VLDPE-EVA total or there is no significant improvement in plastic orientation force above the relatively weak EVA.

FIG. 1 also demonstrates that since higher plastomer contents reduce the orientation force, the plastomer content of the instant film should be less than about 20 wt. % and preferably less than about 17 wt. %.

FIG. 2 shows that for all VLDPE-EVA blends, the hot water free shrink trends upwardly with increasing plastomer content, but the upward slopes of the curves vary substantially, as does the starting point on the ordinate at 0% plastomer. For example, the plastomer-containing 60% VLDPE-40% EVA shrink curve is in a range below the EVA value until the plastomer content is increased to about 20%. But, at this level the plastic orientation force is about that of relatively weak EVA, hence the VLDPE content of the inventive film should be less than about 60 wt. % and preferably less than about 55 wt. %. Conversely, FIG. 2 also shows that shrink improves as the VLDPE content of the two component VLDPE-EVA blend decreases. However, the plastic orientation force of the 30% VLDPE/70% EVA three component blends is prohibitively low as illustrated in FIG. 1. Notwithstanding this limitation, FIG. 2 illustrates there is a range of VLDPE/EVA/-plastomer blends according to this invention wherein free shrink values are similar to EVA yet the plastic orientation force is substantially above the EVA value. More particularly, this was achieved with Samples 10, 11, 12, 14–16, 18–20, 22A–D, 22G and 22H.

FIG. 2 also demonstrates that the ethylene alpha-olefin plastomer copolymer content in the three component blend should be at least about 10 wt. % to achieve substantial improvement in shrink, compared to VLDPE-EVA blends. The slopes of the shrink curves appear to increase above about 10 wt. % plastomer content. For best results the plastomer content should be between about 13 and 17 wt. %. The slopes of the shrink curves appear to diminish in this region and little further improvement in shrink is realized by increasing the plastomer content above about 20 wt. %.

EXAMPLE 4

In one series of tests, three layer heat-shrinkable biaxially oriented films were prepared with commercial equipment, using a commercial film as the control. The purpose was to demonstrate the effects of using at least one layer of the instant three component blend on the film properties including shrink, optical characteristics and curl. Since the commercial film is irradiatively cross-linked after biaxial orientation, the film properties were measured before and after irradiative cross-linking at 3 MR.

The three layer films were prepared by the double or trapped bubble method as broadly described in the aforementioned U.S. Pat. No. 3,456,044. In particular, all three layers were simultaneously coextruded, cooled and then reheated for biaxial orientation. The VLDPE was the aforedescribed Attane XU61520.01 manufactured by the Dow Chemical Company of Midland, Mich., and comprising an ethylene and 1-octene copolymer with a density of about 0.912. The ethylene alpha-olefin plastomer was the aforementioned Tafmer A-1085 manufactured by Mitsui Petrochemical Industries, Ichihara City Chiba, Japan. Where blends were used, they were prepared by tumble mixing and then fed to the inner and outer extruders. The inner extruder had a 3½ inch screw diameter with an L/D ratio of 20:1. The outer extruder was a 2½ inch screw also with a 20:1 L/D ratio. A 60 mm diameter die was used to extrude the primary tube. The resins were heat plastified and extruded into a primary tube of about 1.35 inches diameter and about 0.040 inch wall thickness. The extruder barrel and die temperatures ranged from about 340° to 360° F. (171°-182° C.). The primary tube was cooled to 70° F. and then reheated to about 190° F. for biaxial orientation and cooled. The machine direction (MD) orientation ratio was about 4 to 1, and the transverse direction (TD) orientation ratio was about 5 to 1. Draw point temperature, bubble cooling rates and orientation ratios were adjusted to maximize bubble stability.

In the Example 4 tests, the control film Sample 23 was a first outside layer of 94% EVA (10% VA) and 6% additives (including 3.8% EVA of 10% VA type) comprising the inner layer of a tube, a second outside layer of 76.5% EVA (10% VA), 19.1% VLDPE and 4.4% additives (including 4.2% LLDPE) comprising the outer layer of the tube, and a core layer adhered to the outer side of the inner layer and the inner side of the outer layer. This core layer comprised 75% vinylidene chloride-methyl acrylate copolymer and 25% vinylidene chloride-vinyl chloride copolymer. The finished film thickness was about 1.97 mils and the flat width about 10.75 inches. The individual layer thickness percentages of the total film (outer/core/inner) were as follows: 62.0/11.2/26.8.

Film Sample 24 had an inner layer identical to Sample 23 but was an embodiment of the invention because its second outer layer comprised a blend of three major components wherein the EVA and VLDPE were present in substantially equal concentrations and the ethylene alpha-olefin plastomer (the aforedescribed Mitsui Tafmer A-1085) was present in concentration of about 13.6%. In Sample 24 the additives in the first and second outer layers included about 3.8% EVA and 4% LLDPE respectively, based on the layer's total weight. Film Sample 25 was also an embodiment of the invention as its second outer layer was identical to Sample 24. Its first outer layer contained EVA, VLDPE and plastomer (including 3.8% LLDPE and 3.4% EVA based on the layer's total weight), but its EVA content of 58.1% relative to the VLDPE content of 21.4% (73% EVA in the two component total) is so high that by itself the melt orientation force would be prohibitively low for achieving the advantages of this invention. This is for example illustrated by the 30% VLDPE-70% EVA curve of FIG. 1. Nevertheless, the second outer layer composition satisfies the objectives of this invention so that the total film construction is an embodiment of the invention.

The manufacturing process runnability of invention film Samples 24 and 25 was at least as good as commercial film Sample 23 although it was first necessary to make small adjustments in the operating temperatures to achieve stable conditions.

Certain properties of the resulting biaxially oriented heat-shrinkable film Samples 23-25 were measured by the following methods:

Shrink

The procedure was similar to that described in connection with stretch film Samples 1-25 except that shrink measurements were performed in both the machine direction and the transverse direction for a sample 10 cm × 10 cm.

Haze

ASTM D-1300, Procedure A

Gloss

ASTM D-523, 45° Angle

Curl

Curl is an indication of the ease or difficulty which will be experienced with opening bags fabricated of the film of the given sample. An outward curl ("+" number rating) is an indication that the bags will be easily opened. An inward curl ("−" number rating) is an indication of the degree of difficulty in opening a bag. Curl profiles are categorized as 0 (flat), 1 (about 10 degrees), 2 (about 45 degrees), 3 (about 90 degrees), 4 (about 180 degrees), 5 (one full loop) and 6 (two full loops). To obtain the sample from a tube film, two transverse cuts are made about 8 inches apart, and about 1 inch is cut off in the machine direction from the bottom of the 8 inch section. Next, 1 inch strips are cut from the bottom in the transverse direction and extending about half the 7 inch width of the sample. The cut film section is opened up and draped over the observer's arm with the apex of the fold pointed up. The surface of the film sample facing the observer is the outside surface of the film, i.e. the inside surface for direct contact with enclosed product is away from the observer's vision. This orientation of the film sample section will easily establish whether the direction of curl is toward the "outside" (outside curl) or toward the "inside" (inside curl).

The average curl profile of the eight strips is determined in each side of the tube sample, i.e. two numbers. The same procedure is repeated, but this time, 1 inch is cut off the bottom in the machine direction of the opposite fold of the 8 inch film section. This will provide two additional curl numbers and four altogether. The film curl profile is the minimum and maximum of the four numbers.

These Example 4 tests and results are summarized in Table K (Effect of Irradiative Treatment on Films).

TABLE K

Effect of Irradiative Treatment on Films

| Characteristics | Sample No. | | |
|---|---|---|---|
| | 23 | 24 | 25 |
| Linear feet produced | 6,000 | 9,000 | 9,000 |
| First outside layer (wt. %) | | | |
| EVA (10% VA) | 94.0 | 94.0 | 58.1 |
| VLDPE | — | — | 21.4 |
| Plastomer | — | — | 12.9 |
| Additive(s) | 6.0(a) | 6.0(a) | 7.6(c) |
| Second outside layer (wt. %) | | | |
| EVA (10% VA) | 76.5 | 41.4 | 41.4 |
| VLDPE | 19.1 | 40.8 | 40.8 |
| Plastomer | — | 13.6 | 13.6 |
| Additive(s) | 4.4(b) | 4.2(d) | 4.2(d) |

| | Before | After | Before | After | Before | After |
|---|---|---|---|---|---|---|
| Irradiative Cross-linking Effects | | | | | | |
| Shrink, 80° C. MD/TD | 21/31 | 20/29 | 20/30 | 21/31 | 22/32 | 22/29 |
| Shrink, 90° C. MD/TD | 44/51 | 40/47 | 46/53 | 39/48 | 45/50 | 50/45 |
| Haze | 7.0 | 8.2 | 5.0 | 6.0 | 6.8 | 8.2 |
| Gloss | 68 | 71.7 | 77 | 79.0 | 68 | 71.3 |
| Curl | 3+ | 0-1+ | 6+ | 3-4+ | 5+ | 3-4 |

(a)Includes 3.8% EVA of 10% VA content (2% PA Ampacet 50914 and 4% DHT-4A Ampacet 50041)
(b)Includes 4.2% LLDPE (PA Ampacet 100031)
(c)Includes 3.3% EVA an 4% LLDPE (4% PA Ampacet 100031 and 3.6% DHT-4A Ampacet 50041)
(d)Includes 4.0% LLDPE (PA Ampacet 100031)

Table K shows that the shrink properties of the nonirradiated invention film Samples 24 and 25 were at least equivalent to the commercial film Sample 23. This was surprising because the latter provides the high shrink characteristics of EVA-based multilayer, barrier core layer type films. This is, the first outside layer comprises 94% EVA and the second outside layer contains 76.5% EVA. In contrast, the second outside layer of sample 24 contains only 41.4% EVA as does the second outside layer of Sample 25 which also has only 58.1% EVA in the first outer layer. One would expect that with the intrinsically lower shrink ethylene alpha-olefin VLDPE and plastomers comprising the balance of the outer layer, the shrink properties of nonirradiated film Samples 24 and 25 would have been lower than nonirradiated high EVA film Sample 23.

It should also be noted that the EVA-equivalent shrink properties of invention film Samples 24 and 25 are consistent with the relative shrink properties of the stretch films described in Example 1. By way of illustration, Table H shows that the shrink values of 15% plastomer Samples 11, 15 and 19 are similar to film Samples 23-25. This demonstrates reliability of the Example 1 shrink tests on stretched plaque film for predicting the relative shrink properties of biaxially oriented heat-shrinkable film using similar formulations.

Table K also indicates that the optical properties of nonirradiated films of this invention are at least equivalent and in some instances superior to those of high EVA content multilayer barrier core layer films. More particularly, the haze of invention Sample 24 is substantially lower than EVA film Sample 23 (5.0 vs. 7.0) whereas the gloss is substantially higher (77 vs. 68). The optical characteristics of invention film Sample 25 are substantially equivalent to EVA film Sample 23.

The curl properties of the nonirradiated invention film samples are outward and substantially higher than those of the commercial film Sample 23, i.e. (+5 and +6 vs. +3).

After 3 MR irradiation, the shrink properties of all film samples were somewhat lower, but the invention film samples were still about the same as the irradiated commercial film Sample 23. The haze value of irradiated invention film Sample 24 was still superior to the prior art commercial film Sample 23 (6.0 vs. 8.2) whereas the irradiated invention film Sample 25 was about the same (8.2). The gloss value of irradiated film Sample 23 was still superior to irradiated commercial film Sample 23 (79.0 vs. 71.7) whereas the irradiated invention film sample 25 was about the same (71.3 vs. 71.7). It appears from the foregoing that from the standpoints of shrink and optical properties, there was no advantage in using the three component blend of the invention in both the inside and outside layers of the three layer core barrier film for the high EVA contents of these samples. The best results (in terms of shrink and optical properties) were realized with the three component blend only in the second outside layer. However, Example 6 (discussed hereinafter) shows that by increasing the VLDPE/EVA ratio, further improvement is possible, such as waste reduction, when using the three component blend in both layers.

From the standpoint of curl, irradiation decreased the extent of same for all film samples but there was still more curl in the invention film samples 24 and 25 than in the irradiated commercial film Sample 23. However, the outward curl of irradiated invention film Samples 24 and 25 is considered to be commercially acceptable.

EXAMPLE 5

Additional tests were run to determine other physical properties of the irradiated invention film Samples 24 and 25 and compare same with commercial high EVA content irradiated film Sample 23. These physical properties were measured according to the following procedures:

Room Temperature Tensile Force and Elongation at Break

ASTM D-882, Procedure A

Dynamic Puncture

Measures the energy required to puncture a test sample with a sharp triangular metal point made to simulate a sharp bone end. A Dynamic Ball Burst Tester, Model No. 13-8, available from Testing Machines, Inc., Amityville, Long Island, N.Y., is used, and a ⅜ inch diameter conical tip is installed on the tester probe arm for use in this test procedure. The conical tip has the configuration of a right circular cone, and the angle between the cone axis and an element of the conical surface at the vertex is about 65°. Six test specimens approximately 4 inches square are prepared, a sample is placed in the sample holder, and the pendulum is released. The puncture energy reading is recorded. The test is repeated until samples have been evaluated. The results are calculated in cm-kg per mil of film thickness and averaged.

Hot Water Puncture

Hot water puncture values are obtained by performing the hot water puncture test as follows. Water is heated to 95°±1° C. A ⅜ inch round wooden dowel is sharpened on one end to a conical point. This sharpened point has the configuration of a right circular cone, and the angle between the cone axis and an element of the conical surface at the vertex is about 60°. This sharp point is then rounded to a spherical tip of about 1/16 inch diameter. The wooden dowel is fastened to a wooden block so that the rounded point projects 1½ inches beyond the end of the wooden block. A specimen about 3 inches wide in the transverse direction (TD) and about ten inches long is cut from the test sample material. One end of the specimen is placed on the end of the wooden block opposite the pointed dowel. The specimen is wrapped around the end of the sharpened dowel and back to the wooden block on the opposite side, where it is secured. The film thickness in the area of contact with the sharpened dowel is measured in order to assure that the film specimen thickness is truly representative of the given test sample material. The specimen and pointed dowel are quickly immersed into the hot water and a timer is started. The timer is stopped when the dowel point punctures the film specimen. The test procedure is repeated five more times with new 3 inch wide TD specimens from the given test sample material. The time required for penetration is recorded and then averaged for the six TD specimens.

Average Gauge

ASTM D-2103

Secant Modulus at Room Temperature

ASTM D-822, Method A

Shrink Force

The shrink force of a film is that force or stress required to prevent shrinkage of the film and was determined from film samples taken from each film. Four film samples were cut 1" (2.54 cm) wide by 7" (17.8 cm) long in the machine direction and 1" (2.54 cm) wide by 7" (17.8 cm) long in the transverse direction. The average thickness of the film samples was determined and recorded. Each film sample was then secured between two clamps spaced 10 cm apart. One clamp is in a fixed position and the other is connected to a strain gauge transducer. The secured film sample was then immersed in a silicone oil bath maintained at a constant elevated temperature for a period of five seconds. During this time, the force in grams at the elevated temperature was recorded. At the end of this time, the film sample was removed from the bath and allowed to cool to room temperature whereupon the force in grams at room temperature was also recorded. The shrink force for the film sample was then determined from the following equation wherein the result is obtained in grams per mil of film thickness (g/mil):

$$\text{Shrink Force (g/mil)} = \frac{F}{T}$$

wherein F is the force in grams and T is the average thickness of the film samples in mils.

Impulse Sealing Range

This test was run to determine and compare the acceptable voltage ranges for impulse sealing the test films. A Sentinel Model 12-12AS laboratory sealer manufactured by packaging Industries Group, Inc., Hyannis, Mass. was used. This impulse sealer was equipped with a replacement sealing ribbon for a Multivac AG100. The ribbon is available from Koch Supplies of Kansas City, Mo. In this test, two four inch wide (T.D. direction) samples are cut from a tubular film. The impulse sealer is equipped with controls for coolant flow, impulse voltage and time, and seal bar pressure. These controls except for impulse voltage was set at the following conditions:

0.5 seconds impulse time (upper ribbon only)
2.2 seconds cooling time
50 psi (345 kPa) jaw pressure
0.3 gallon per minute (1 liter per minute) cooling water flow One of the samples was folded in half for use in determining a minimum sealing voltage. This folding simulates folding which may inadvertently occur during conventional tube sealing operations. The folded sample which now had four layers was placed into the sealer and by trial and error the minimum voltage to seal the bottom two layers to each other was determined.

The maximum voltage was then determined for the two layer sample by placing it in the sealer and then activating the seal bar. The film sample was manually pulled with about 0.5 lbs. of force and the voltage which does not cause burn-through or significant distortion of the seal was determined.

The physical properties (other than shrink) of irradiated control film Sample 23 and invention embodiment Samples 24 and 25 are compared in Table L (Irradiated Multilayer Films—Physical Properties). Inspection of this Table shows that the physical properties are similar with two exceptions. The force properties of Sample 24 (plastomer only in second outside layer) were slightly superior to control Sample 23 but the force properties of Sample 25 (plastomer in both first and second outside layers) were slightly inferior to control Sample 23. The impulse seal range was desirably broader for Sample 24 than control Sample 23 but narrower for Sample 25. However the hot water seal force for invention Sample 25 was substantially better than either control Sample 23 or invention Sample 24. Hot water seal strength is a measure of the ability of a heat seal to withstand exposure to hot water under conditions of constrained shrink. Heat seals are made and then the heat sealed samples are tested after aging for various time intervals up to seven days. The time (in seconds) it takes for the seal to fail after immersion in 90° C. water is a measure of seal strength.

TABLE L

| Irradiated Multilayer Films - Physical Properties | | | |
|---|---|---|---|
| | Sample No. | | |
| Property | 23 | 24 | 25 |
| Tensile, MD, psi | 10,870 | 10,830 | 10,150 |
| Tensile, TD, psi | 12,730 | 13,290 | 12,330 |
| Elongation at Break MD, % | 137 | 147 | 153 |
| Elongation at Break TD, % | 173 | 161 | 192 |
| Secant Modulus RT, MD, psi | 36,714 | 37,155 | 33,490 |
| Secant Modulus RT, TD, psi | 36,966 | 36,500 | 32,020 |
| Shrink Force, 90° C. MD/TD, g/mil | 150/158 | 150/155 | 127/159 |
| Shrink Force, RT, MD/TD g/mil | 43/59 | 43/50 | 45/54 |
| Dynamic Puncture cm kg/mil | 1.98 | 1.94 | 1.98 |
| Hot Water Puncture | 2.17/120+ | 2.17/120+ | 2.21/120+ |

TABLE L-continued

Irradiated Multilayer Films - Physical Properties

| Property | Sample No. 23 | 24 | 25 |
|---|---|---|---|
| Wood, TD, 95° C. | | | |
| Impulse Heat Seal Range Volts | 33–46 | 33–49 | 36–44 |
| Hot Water Seal Force | | | |
| 20 minutes | 12.8 | 14.4 | 25.4+ |
| 24 hours | 16.1 | 21.0 | 26.1+ |
| 7 days | 14.5 | 13.0 | 22.0 |

EXAMPLE 6

Still another series of tests was performed in which three layer films were prepared in the same manner as in Example 4, and using the same equipment. One purpose of these tests was to compare waste rates in a qualitative sense. Another purpose was to compare bubble stability of a high EVA-type first and second outer layer commercial film (the aforedescribed Sample 23), a high VLDPE-low EVA type first and second outer layer commercial film with ethylene alpha-olefin copolymer plastomer (Sample 26), and several embodiments of the invention wherein the aforedescribed Tafmer A-1085 plastomer was added to either or both the first outside layer (the inner layer of the extruded tube) and the second outside layer (the outside layer of the extruded tube). In Sample 27, the plastomer was only included in the second outside layer. In Sample 28, the plastomer was included in both the first and second outside layer in a concentration of 15 wt. %, and both of these layers comprised 45% VLDPE-55% EVA on a two component basis. In Sample 29 the EVA content of the first outer layer was increased to 54.7% and the plastomer content of both layers was about the same as in Sample 28. The second outer layers of Samples 29-32 were identical and very similar to Sample 28. In Sample 30 the plastomer content of the first outer layer was increased to 23.7 wt. % and the VLDPE/EVA ratio remained the same as Sample 29. In Sample 31 the EVA and VLDPE contents were increased to equal quantities and the plastomer content was decreased in the first outer layer, relative to Sample 30. In Sample 32 the EVA content was further increased and the VLDPE content decreased while the plastomer content remained about the same, all in the first outer layer.

In these tests the target flat width of the biaxially oriented tube was 10.89 inches and the tube thickness was about 1.97 mils. The target thickness ratio of the layers was in terms of percent, 62.0 for the second outer layer/9.9 for the vinylidene chloride copolymer barrier layer/28.1 for the first outer layer, the latter being the inner layer of the tube. These films were not irradiated.

The results of these tests are summarized in Table M (EVA Effect on Bubble Stability).

TABLE M

EVA Effect on Bubble Stability

| Characteristics | 23 | 26 | 27 | 28 | 29 | 30 | 31 | 32 |
|---|---|---|---|---|---|---|---|---|
| Linear feet produced (approx) | 6,000 | 6,000 | 3,000 | 6,000 | 3,000 | 3,000 | 3,000 | 3,000 |
| First outside layer | | | | | | | | |
| EVA (10% VA) | 94.0 | 22.5 | 22.5 (24.5) | 34.5 (45) | 41.6 (54.7) | 30.7 (54.3) | 38.3 (50) | 44.2 (58.3) |
| VLDPE | | 69.1 | 69.1 (75.5) | 42.1 (55) | 34.5 (45.3) | 25.8 (45.7) | 38.7 (50) | 31.5 (41.7) |
| Plastomer | | 0 | 0 | 15.0 | 14.9 | 23.7 | 12.5 | 13.2 |
| Additives | 6.0[e] | 8.4[f] | 8.4[f] | 8.4[f] | 8.4[f] | 21.5[g] | 10.5[h] | 11.1[i] |
| Second outside layer | | | | | | | | |
| EVA (10% VA) | 76.5 | 22.5 | 34.9 (43.8) | 36.3 (45) | 34.9 (43.8) | 34.9 (43.8) | 34.9 (43.8) | 34.9 (43.8) |
| VLDPE | 19.1 | 69.1 | 44.8 (56.2) | 44.3 (55) | 44.8 (56.2) | 44.8 (56.2) | 44.8 (56.2) | 44.8 (56.2) |
| Plastomer | 0 | 0 | 16.3 | 15.0 | 16.3 | 16.3 | 16.3 | 16.3 |
| Additives | 4.4[j] | 8.4[j] | 4.0[k] | 4.4[j] | 4.0[k] | 4.0[k] | 4.0[k] | 4.0[k] |
| Shrink (90° C.) MD/TD | 44/51 | 30/41 | 34/44 | 33/42 | 46/53 | 43/52 | 38/48 | 40/49 |
| Haze | 7.0 | 5.0 | 5.1 | 5.5 | 4.9 | 6.4 | 7.1 | 8.4 |
| Gloss | 68 | 74.3 | 76.0 | 73.6 | 73.1 | 74.0 | 66.3 | 66.7 |
| Curl | 3+ | 1+ | 6+ | 6+ | 6+ | 6+ | 6+ | 6+ |
| Estimated Waste, % | high[a] | low[b] | low[c] | low[c] | low[c] | low[c] | high[d] | high[d] |

[a]high waste is typical for commercial production of this 10 inch flat width film.
[b]low waste is typical for commercial production of this 10 inch flat width film.
[c]During the brief run of this film no unusual bubble stability problems were observed so the estimated waste is the same as Sample 29.
[d]During the brief run of this film some bubble breaks occurred, so the estimated waste is the same as Sample 23.
[e]Includes 3.8% EVA of 10% VA content.
[f]Includes 3.8% EVA and 4.2% LLDPE.
[g]Includes 10.5% EVA and 10.0% LLDPE.
[h]Includes 4.8% EVA and 5.3% LLDPE.
[i]Includes 5.0% EVA and 5.6% LLDPE.
[j]Includes 4.2% LLDPE.
[k]Includes 3.8% LLDPE.

Referring now to Table M, it will be observed that the shrink values for high EVA outer layer biaxially oriented commercial barrier-type film Sample 23 at 44/51% is significantly higher than high VLDPE outer layer biaxially oriented commercial barrier type film Sample 26 at 39/41%. However, the waste rate of a commercial film such as Sample 23 is considered as being high relative to the waste rate of a commercial film such as Sample 26. When 16.3% plastomer was added to the second outside layer only (the outside layer of the tube) in Sample 27, the shrink was somewhat improved to 34/44% compared to Sample 26. At the same time, the waste rate appeared to be at the same level as Sample 26. Optical properties remained about the same. When in Sample 28, 15.0% plastomer was added to the first outer layer to match the 15.0% plastomer in the second outer layer and the EVA/VLDPE ratio was adjusted to 45/55 in both layers, the shrink and optical properties as well as the estimated waste rate remained about the same as Sample 27.

When in Sample 29 the EVA content was increased and the VLDPE decreased only in the first outside (inner) layer, there was a substantial improvement in shrink, i.e. 46/53% versus 33/42% for Sample 28. At the same time the opticals improved as the haze declined to 4.9% (versus 5.5% for Sample 28, although the gloss declined slightly. The estimated waste remained at the same level. Based on the aforedescribed comparisions, Sample 29 is the most preferred embodiment of the invention known to the inventor.

When in Sample 30 the plastomer content of the first outside layer was increased to 23.7 wt. %, the shrink percentages declined slightly compared to Sample 29, and the haze increased significantly from 4.9% to 6.4%. When in Sample 31 the EVA content was increased along with the VLDPE content at the expense of lower plastomer content in the first outside layer, there was further loss of shrink relative to Sample 30, and further loss of optical properties. Moreover, bubble breaks were experienced in this relatively short operating period to make 3,000 ft. of film. It appears from this comparison that the EVA content had been increased to a level where it adversely affected the bubble stability. The same trend of losing most desirable properties continued when in Sample 32 the EVA content was further increased and the VLDPE correspondingly decreased. That is, the optical properties were poorer and bubble breaks indicated that bubble stability was inferior.

It will be noted in Table M that both the first outside (inner) layer and the second outside (outer) layer of the tubes contain substantial quantities of additives, and these additives in turn include substantial quantities of either or both EVA and LLDPE. The additive EVA content may be considered as part of the layer's total EVA content, and on this basis the total EVA content may be calculated as a weight percent of the layer's major constituent total. Similarly, the LLDPE content may be considered as part of the layer's total polyethylene content and as a weight percent of the layer's major constituent total. These relationships for Samples 23 and 26-32 are set forth in Table N (Total EVA and PE content)

TABLE N

| Sample No. | Total EVA and PE Content | |
|---|---|---|
| | Total EVA | Total PE |
| 23 first layer | 100 | 0 |
| second layer | 76.7 | 23.3 |
| 26 first layer | 26.4 | 73.6 |
| second layer | 23.5 | 76.5 |
| 27 first layer | 26.4 | 73.6 |
| second layer | 41.8 | 58.2 |
| 28 first layer | 45.3 | 54.7 |
| second layer | 42.8 | 57.2 |
| 29 first layer | 54.0 | 46.0 |
| second layer | 41.8 | 58.2 |
| 30 first layer | 53.5 | 46.5 |
| second layer | 41.8 | 58.2 |
| 31 first layer | 49.5 | 50.5 |
| second layer | 41.8 | 58.2 |
| 32 first layer | 49.7 | 50.3 |
| second layer | 41.8 | 58.2 |

EXAMPLE 7

A series of tests were performed to demonstrate the effect of EVA vinyl acetate content on the plastic orientation force and shrink properties in films of this invention. Whereas the previously described tests involved ethylene vinyl acetate having 10% vinyl acetate, these tests included resin formulations having lower VA content (4.5%) and higher VA content (18%), but wherein the compositions were otherwise identical. Plaques were prepared in the aforedescribed manner and stretched in the same manner as previous examples to determine plastic orientation force. The free shrink was then measured also using the aforedescribed procedure, and the results are summarized in Table O (Effect of VA content in EVA).

TABLE O

| | Effect of VA Content In EVA | | |
|---|---|---|---|
| Sample No. | Constituents (wt. %) | Force At 3 Inches (lbs.) | Stretch Direction Shrink at 90° C. (%) |
| 33 | 42.5% EVA (4.5% VA) 42.5% VLDPE[a] 15% Tafmer A-1085 | 3.98 | 52.5 |
| 34 | 42.5% EVA (10% VA) 42.5% LDPE[a] 15% Tafmer A-1085 | 4.14 | 59.5 |
| 34 | 42.5% EVA (18% VA) 42.5% VLDPE[a] 15% Tafmer A-1085 | 3.22 | 62 |

[a]LDPE was Dow's type XU61520.01 (density 0.912)

Inspection of Table O shows that the plastic orientation force is slightly higher at 10% VA than 4.5% VA, and substantially higher at either of these vinyl acetate contents than at 18% VA. On the other hand, shrink improves with increasing vinyl acetate content although the value at 18% VA is only slightly higher than at 10% VA. On the basis of these comparisons, any vinyl acetate content—EVA may be used in the practice of this invention, but a preferred range is about 8-12%.

EXAMPLE 8

Another series of tests were conducted to determine the effect of performing the plastic orientation force tests on plaques pulled at room temperature (about 70° F.) instead of at 180° F., as used in the previously described plaque tests. The results of these tests are summarized in Table P (Room Temperature Plastic Orientation).

TABLE P

| | Room Temperature Plastic Orientation | | |
|---|---|---|---|
| Sample No. | Constituents (wt. %) | Force at 3 Inches (lbs.) | Force Direction Shrink at 90° C. (%) |
| 36 | 95.6% VLDPE[b] 4.4% P.A.[a] | 14.1 | 47 |
| 36A | 97.5% EVA 2.5% P.A. | 12.05 | 67 |
| 37 | 42.5% EVA (4.5% VA) 42.5% VLDPE,[c] 15% Tafmer A-1085 | 12.6 | 57 |

[a]Processing aid was Ampacet type 10919
[b]VLDPE was Dow's type XU61520.01 (density 0.912)
[c]VLDPE was Dow's type 4001 (density 0.912)

Table P shows that with formulations of this invention, (Sample 37) it may be possible to make shrinkable films at room temperature.

EXAMPLE 9

Figure 4:
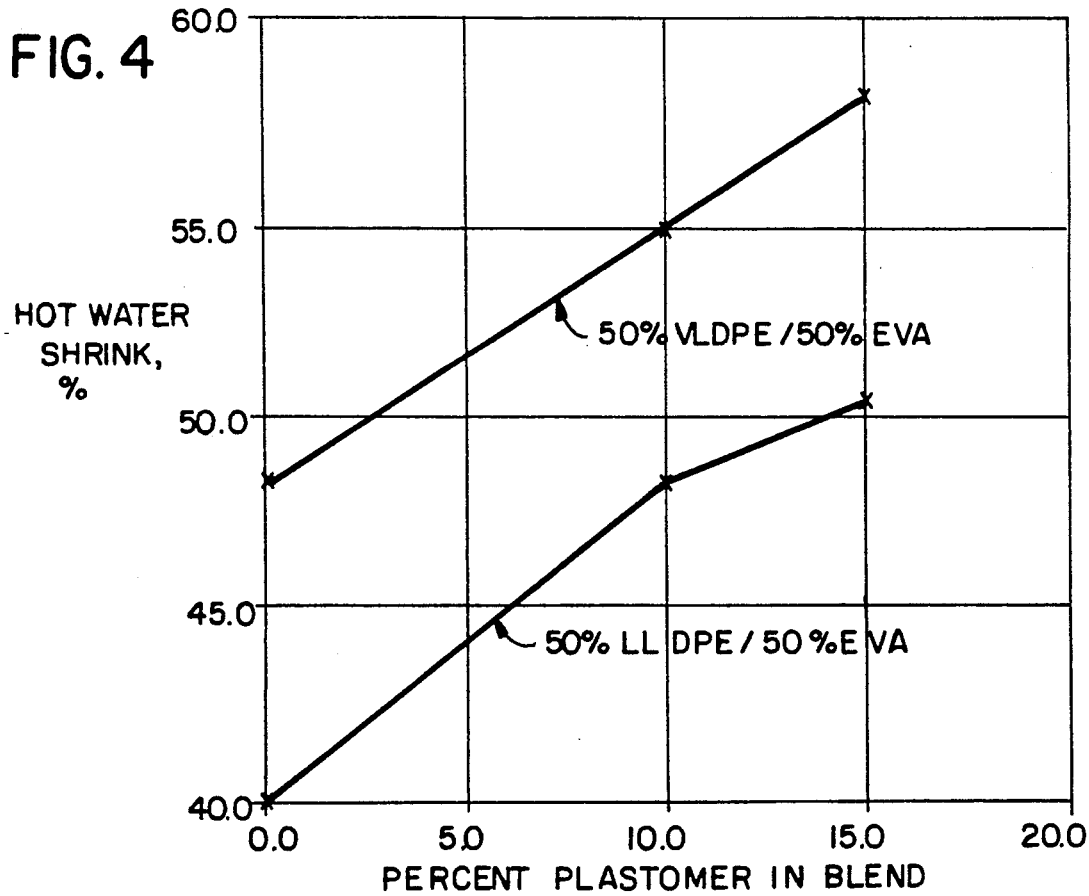

Although the preferred polyethylene in the three component blend film of this invention is VLDPE, another series of tests demonstrates that improvement in shrink may also be achieved with LLDPE as the polyethylene rather than VLDPE. Plaques of various blends were prepared in the aforedescribed manner and the plastic orientation force determined by pulling heated strips of each material (in duplicate). Free shrink at 90° C. was then measured for each stretched sample. VLDPE-containing samples were included for comparison with the LLDPE-containing samples. The VLDPE was the aforedescribed type XU61520.01, an octene-ethylene copolymer manufactured by Dow (density 0.912), and the LLDPE was Dowlex 2045 (density 0.920) an octene-ethylene copolymer also manufactured by Dow. The EVA was Union Carbide type 6833 (VA content 10%) and the ethylene alpha-olefin plastomer was the aforedescribed Tafmer A-1085. The results of these tests are summarized in Table Q (LLDPE Plastic Orientation Force and Shrink), and shown in graph form as FIG. 3 (plastic orientation force as ordinate vs. percent plastomer as abscissa) and FIG. 4 (free shrink as ordinate vs. percent plastomer as abscissa).

TABLE Q

LLDPE Plastic Orientation Force and Shrink

| Sample No. | Constituents (wt. %) | Force At 3 in. (lbs) | Stretch Direction Shrink At 90° C. (%) |
| --- | --- | --- | --- |
| 38 | 50% VLDPE 50% EVA | 4.76 | 48 |
| 39 | 45% VLDPE 45% EVA 10% Plastomer | 4.41 | 54 |
| 40 | 42.5% VLDPE 42.5% EVA 15% Plastomer | 4.16 | 58 |
| 41 | 50% LLDPE 50% EVA | 5.38 | 40 |
| 42 | 45% LLDPE 45% EVA 10% Plastomer | 4.89 | 48 |
| 43 | 42.5% LLDPE 42.5% EVA 15% Plastomer | 4.74 | 50 |

The data and graphs show that the plastic orientation force of two component LLDPE-EVA is slightly higher than two component VLDPE-EVA by about 0.6 lbs. This difference is maintained as plastomer is added up to at least 15% plastomer. The plastic orientation forces trend downwardly, but the decline is not believed sufficient to substantially effect processing efficiency. The two component shrink data demonstrates that VLDPE provides substantially higher shrink than LLDPE, and this difference is maintained up to at least 15% plastomer as the latter is added to the polyethylene-EVA blend. The percent shrinkage trends upwardly as plastomer is added, and about 10% plastomer is required in an LLDPE-EVA-plastomer blend to realize the same free shrink as a 50% VLDPE-50% EVA blend without plastomer.

EXAMPLE 10

Still other tests were conducted to determine the improvement in bubble stability when employing a film of the present invention. For this purpose three layer films were compared including two controls and a third film representing an embodiment of the present invention.

In all three samples, the core layer was composed of the same blend of 75% vinylidene chloride-methyl acrylate copolymer and 25% vinylidene chloride-vinyl chloride copolymer.

The material of the core layer is sensitive to heat and decomposes readily when even slightly overheated, resulting in so called "black spots" in the film. These black spots are formed when specks of decomposed polyvinylidene chloride become embedded in the wall of the primary tube. These black spots are undesirable because they absorb heat at a disproportionately high rate when the primary tube is heated and inflated for orientation. The resulting localized "hot spots" cause the orientation bubble to break. It generally has been found that where the tube outer layer is composed primarily of EVA, the stability of the orientation bubble decreases as the size of the black spots increases and the bubble is almost sure to fail when black spots reach about 2 mm in diameter. The addition of VLDPE to the blend of the outer tube layer decreases the sensitivity to black spots and improves the stability of the orientation bubble so the bubble is less likely to collapse if black spots reach or exceed the 2 mm size. This decrease in sensitivity to black spots is reflected in lower film waste for these films verses a film having no VLDPE in the tube outer layer. However, the decrease in film waste is obtained at the cost of decrease in shrink properties.

For purposes of this example a control film, Sample 44, was prepared in the same manner as in Example 4 and using the same equipment wherein the film is extruded as a tube and then is reheated and inflated for orientation. Control Sample 44 was identical in the film construction to Sample 23, that is, it had a first outer layer (tube inner layer) composed primarily of EVA and a second outer layer (tube outer layer) of an EVA/VLDPE blend. After running this control Sample 44, the composition of the second outer layer was changed to a three component blend including an ethylene alpha-olefin copolymer and a second film was produced. This second film, Sample 45 was produced under the same operating conditions as the control, Sample 44, except for a small change in the machine direction speed during orientation sufficient to maintain the film thickness of Sample 45 comparable to that of Sample 44.

The shrink properties of each sample was measured in both the machine (MD) and transverse (TD) directions. Both the waste and shrink values of both Samples 44 and 45 are reported in Table R.

Also reported in Table R are the shrink and waste values (based on historical data) for a second control, Sample 46. This Sample 46 is a commercial three layer film having first and second outer layers similar to Sample 26 (see Table M) and PVDC core layer. Since the second outer layer (tube outer layer) of Sample 46 has a higher proportion of VLDPE than Sample 44, it is less susceptible to the presence of black spots and has a more stable orientation bubble. This stability is evident by comparing the historical waste figures for Sample 46 to the actual calculated waste for control Sample 44. However, as noted above, the decrease in waste is at the expense of lower MD and TD shrink properties.

In the case of a film embodiment of the present invention, Sample 45, the data in Table R shows that it has shrink properties comparable to the commercial film of Sample 44 (EVA first outer layer) and a percent of waste comparable to the historical waste values for Sample 46 (VLDPE-EVA first outer layer).

Thus this example demonstrates a film according to present invention including a three component blend of VLDPE-EVA and ethylene alpha-olefin copolymer plastomer, has the shrink properties of an EVA film while providing the bubble stability and reduced waste of a VLDPE-EVA film.

TABLE R

| Plastomer Effect On Shrink And Waste | | | |
|---|---|---|---|
| | Sample 44 | Sample 45 | Sample 46 |
| First Outer Layer | | | |
| EVA (10% VA) | 94.0 | 94.0 | 22.5 |
| VLDPE | 0 | 0 | 69.1 |
| Plastomer | 0 | 0 | 0 |
| Additives | 6.0 | 6.0 | 8.4 |
| Second Outer Layer | | | |
| DVA (10% VA) | 76.5 | 36.3(45) | 22.5 |
| VLDPE | 19.1 | 44.3(55) | 69.1 |
| Plastomer | 0 | 15.0 | 0 |
| Additives | 4.4 | 4.4 | 8.4 |
| Core Layer PVDC | 100.0 | 100.0 | 100.0 |
| Shrink (90° C.) MD/TD | 44/54 | 44/54 | 30/40(b) |
| Waste % | High(b) | Low(a) | Low(b) |

(a)calculated actual
(b)historical value

Further modifications of the invention will be apparent to those skilled in the art and all such modifications are deemed to be within the scope of the invention as outlined in the following claims.

What is claimed is:

1. A biaxially oriented heat-shrinkable film comprising a three component blend of a polyethylene member selected from the group consisting of VLDPE and LLDPE or a mixture thereof, ethylene alpha-olefin plastomer copolymer of density below about 0.90 g/cm$^3$ and ethylene vinyl acetate as major components, wherein as between the polyethylene and ethylene vinyl acetate total the polyethylene comprises between about 35 and about 60 wt. % of the total and ethylene vinyl acetate comprises between about 40 and about 65 wt. % of the total, and wherein said ethylene alpha-olefin plastomer copolymer comprises between about 10 and about 20 wt. % of the total weight of said three component blend.

2. A biaxially oriented heat-shrinkable film according to claim 1 wherein said film is a monolayer.

3. A biaxially oriented heat-shrinkable film according to claim 1 wherein said blend comprises at least one layer of a multilayer film.

4. A biaxially oriented heat-shrinkable film according to claim 1 wherein said ethylene alpha-olefin plastomer copolymer comprises between about 13 and about 17 wt. % of the total weight of said three component blend.

5. A biaxially oriented heat-shrinkable film according to claim 1 wherein said polyethylene member is VLDPE.

6. A biaxially oriented heat-shrinkable film according to claim 1 wherein said polyethylene member is VLDPE comprising between about 45 and about 55 wt. % of the VLDPE and ethylene vinyl acetate total.

7. A biaxially oriented heat-shrinkable film according to claim 1 wherein said polyethylene member is LLDPE comprising between about 45 and about 55 wt. % of the LLDPE and ethylene vinyl acetate total.

8. A biaxially oriented heat-shrinkable film according to claim 3 wherein said multilayer film comprises at least three layers including an oxygen barrier core layer between a first outer layer and a second outer layer and said blend comprising at least one of the first and second outer layers.

9. A biaxially oriented heat-shrinkable film according to claim 1 wherein said polyethylene member is VLDPE having higher crystallinity than said ethylene alpha-olefin plastomer copolymer.

10. A biaxially oriented heat-shrinkable film according to claim 1 wherein said polyethylene member is VLDPE melting at higher temperature than said ethylene alpha-olefin plastomer copolymer.

11. A biaxially oriented heat-shrinkable film according to claim 1 wherein said polyethylene member is VLDPE having a crystalline melting point between about 100° C. and about 125° C., and said ethylene alpha-olefin plastomer copolymer melts between about 55° C. and about 85° C.

12. A biaxially oriented heat-shrinkable film according to claim 1 wherein said polyethylene member is VLDPE having a crystalline melting point between about 115° C. and about 125° C.

13. A biaxially oriented heat-shrinkable film according to claim 1 wherein said polyethylene member is VLDPE having a higher Young's modulus value than said ethylene alpha-olefin plastomer copolymer.

14. A biaxially oriented heat-shrinkable film according to claim 1 wherein said polyethylene member is VLDPE having a Vicat softening point of at least about 68° C.

15. A biaxially oriented heat-shrinkable film according to claim 14 wherein said VLDPE has a Vicat softening point between about 78° C. and about 100° C.

16. A biaxially oriented heat-shrinkable film according to claim 1 wherein said ethylene alpha-olefin plastomer has a Vicat softening point below about 68° C.

17. A biaxially oriented heat-shrinkable film according to claim 16 wherein said ethylene alpha-olefin plastomer has a Vicat softening point between about 50° C. and about 65° C.

* * * * *

UNITED STATES PATENT AND TRADEMARK OFFICE
CERTIFICATE OF CORRECTION

PATENT NO. : 5,283,128
DATED : February 1, 1994
INVENTOR(S) : Darrel L. Wilhoit

It is certified that error appears in the above-identified patent and that said Letters Patent is hereby corrected as shown below:

TITLE PAGE:
[75] Inventors: delete "Darrell" and insert —Darrel—.

[45] Date of Patent: insert —*— before the date.

Insert —[*] Notice: The portion of the term of this patent subsequent to Dec. 21, 2010, has been disclaimed.—.

Column 6, line 16, delete "pastomer" and insert —plastomer—.

Column 6, line 56, delete "2048" and insert —2045—.

Column 10, line 60, delete "126,000" and insert —125,000—.

Column 11, line 15, delete "copolymer" and insert —copolymer)—.

Column 15, line 41, delete "baxially" and insert —biaxially—.

Column 15, line 41, delete "emboiment" and insert —embodiment—.

Column 15, line 65, delete "2" and insert —22—.

Column 21, line 26, delete "50/45" and insert —40/45—.

Column 21, line 29, delete "3-4" and insert —3-4+—.

Column 21, line 32, delete "EVA an" and insert —EVA and—.

UNITED STATES PATENT AND TRADEMARK OFFICE
CERTIFICATE OF CORRECTION

PATENT NO. : 5,283,128
DATED : February 1, 1994
INVENTOR(S) : Darrel L. Wilhoit

It is certified that error appears in the above-indentified patent and that said Letters Patent is hereby corrected as shown below:

Column 21, line 41, delete "This is," and insert —That is,—.

Signed and Sealed this

Twenty-seventh Day of December, 1994

Attest:

BRUCE LEHMAN

Attesting Officer    Commissioner of Patents and Trademarks